NORACONK & HOATS.
Clover Huller.
No. 30,982.            Patented Dec. 18, 1860.
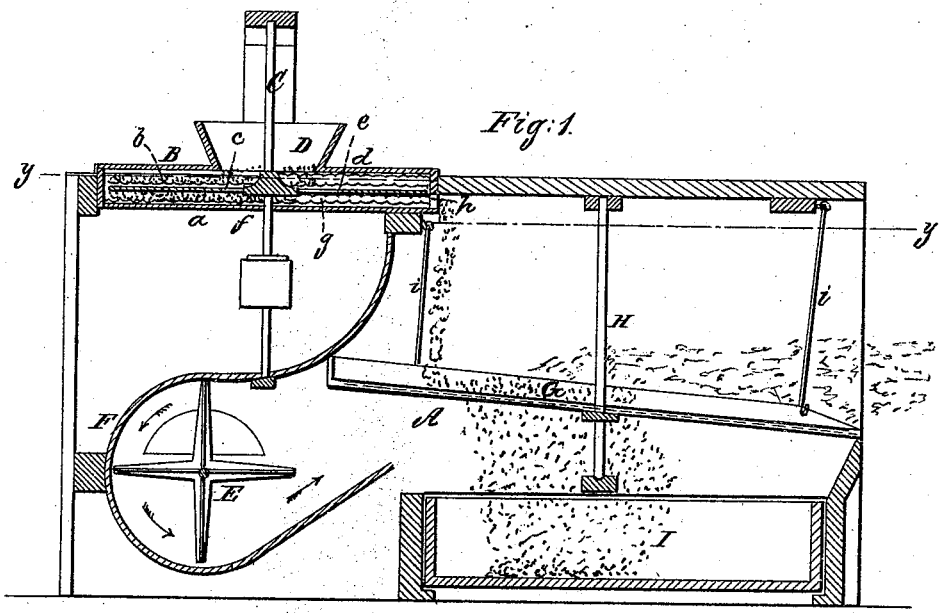
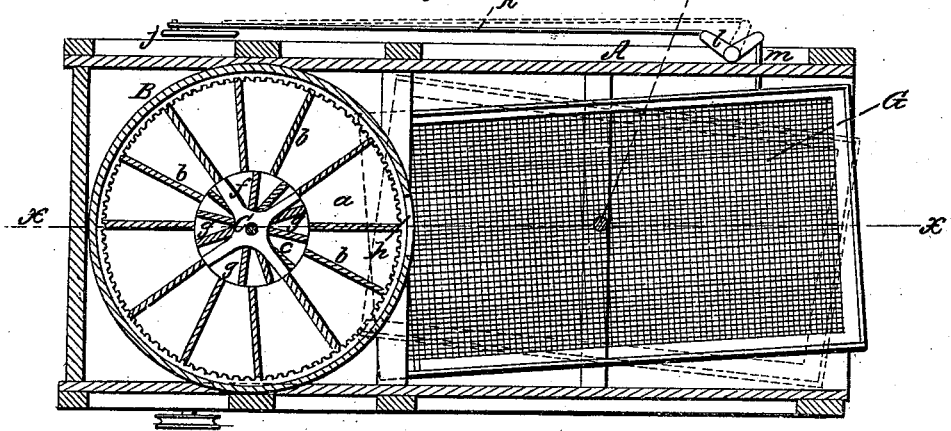
Witnesses:
Inventors:
M. F. Noraconk
David Hoat
per Munn & Co.
attorneys.

UNITED STATES PATENT OFFICE.

M. F. NORACONK AND D. HOATS, OF MILTON, PENNSYLVANIA.

MACHINE FOR HULLING CLOVER-SEED.

Specification of Letters Patent No. 30,982, dated December 18, 1860.

*To all whom it may concern:*

Be it known that we, M. F. NORACONK, and DANIEL HOATS, of Milton, in the county of Northumberland and State of Pennsylvania, have invented a new and Improved Machine for Hulling Clover-Seed; and we do hereby declare that the following is a full, clear, and exact description of the same, reference being had to the annexed drawings, making a part of this specification, in which—

Figure 1 is a side sectional view of our invention taken in the line $x$, $x$, Fig. 2; Fig. 2, a horizontal section of the same taken in the line $y$, $y$, Fig. 1.

Similar letters of reference indicate corresponding parts in the two figures.

This invention consists in the employment or use of a rotating and two stationary hulling disks and a fan and screen arranged as hereinafter fully shown and described, whereby the desired work, to wit, the separating of clover seed from its hulls may be expeditiously and perfectly performed.

To enable those skilled in the art to fully understand and construct our invention we will proceed to describe it.

A, is a rectangular box or case in the upper part of which a hollow drum or cylinder B, is placed through which a vertical shaft C, passes. This shaft has placed on it a circular disk $a$, the upper and under surfaces of which are provided with radial serrated ribs $b$. This disk $a$, also has an opening $c$, at its center. The under surface of the top plate $d$, of the cylinder B, has also radial serrated ribs $e$, and the upper surface of the under plate $f$, of the cylinder B, is provided with similar ribs $g$. The disk $a$, is within the cylinder B, at equal distances from the two plates $d$, $f$. The cylinder B, is provided with an opening $h$, at its front end below the disk $a$, and it has a hopper D, at its top concentric with it.

Within the box or case A, at its lower part below the cylinder B, there is placed a rotary fan E. This fan is inclosed within a suitable box F, and directly in front of it there is a screen G, which is suspended from the upper part of the box or case by rods $i$. The screen G is slightly inclined, its outer end being the most depressed and through the center of the screen there passes a vertical shaft H, which serves as a fulcrum for the screen, as the latter works on the former as a center, the shaft passing about through the center of the screen.

To one end of the fan shaft there is attached a crank pulley $j$, which has a rod $k$, connected to it. The front end of this rod $k$, is attached to a bent lever $l$, which is connected to the front end of the screen G, by a rod $m$. In the case or box A, and below the screen G, there is placed a drawer I.

The operation is as follows: The shaft C, and fan F, are rotated by any convenient power and the clover seed is placed in the hopper D, and passes down between the rotating disk $a$, and the plates $d$, $f$, the seed passing into the lower compartment through the opening $c$, the seed by the rotation of the disk $a$, is subjected to a rubbing sufficient to detach the hulls from it and the seed and hulls are discharged through the opening $h$, and fall on the screen G, which has a double vibrating movement in consequence of the shaft H, passing through its center. This motion renders the screen much more efficient than those having the usual lateral vibrating movement. The clover seed passes through the screen G, into the drawer I, and the hulls are blown out from the case by the fan E.

Having thus described our invention what we claim as new and desire to secure by Letters Patent, is—

1. The rotating and stationary hulling disks $a$, $d$, $f$, in connection with the screen G, and fan E, arranged for joint operation as and for the purpose set forth.

2. Placing the suspended screen G, on the shaft H, for the purpose of giving the former the double vibrating movement as described.

M. F. NORACONK.
D. HOATS.

Witnesses:
A. STRAUB,
J. W. YOUNG.